Figure 1:
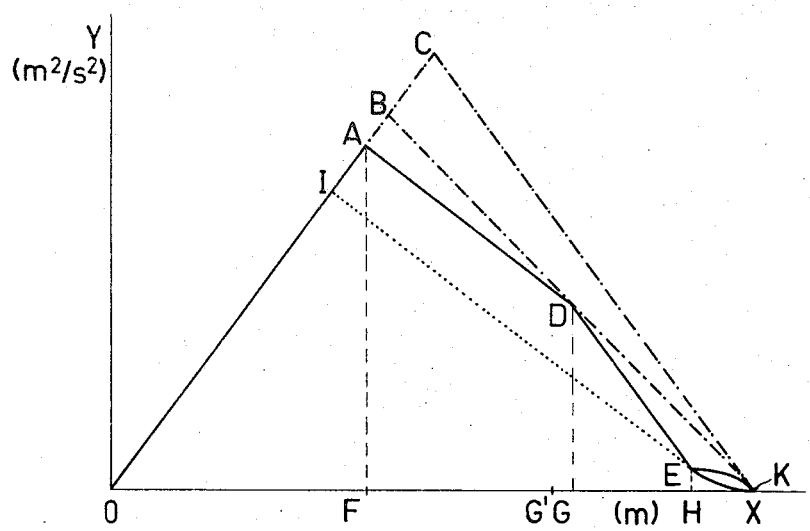

United States Patent [19]
Visser

[11] 3,809,986
[45] May 7, 1974

[54] POSITIONING DEVICE

[75] Inventor: Wim Visser, Rijswijk, Netherlands

[73] Assignee: U.S. Philips Corporation, New York, N.Y.

[22] Filed: Feb. 15, 1973

[21] Appl. No.: 332,735

[30] Foreign Application Priority Data
Feb. 18, 1972 Netherlands.................... 7202140

[52] U.S. Cl.............................. 318/561, 318/571
[51] Int. Cl..................... G11b 21/08, G05b 19/28
[58] Field of Search............................ 318/561, 571

[56] References Cited
UNITED STATES PATENTS
| 3,668,494 | 6/1972 | Agin | 318/561 X |
| 3,482,155 | 12/1969 | Fredriksen | 318/561 |
| 3,629,560 | 12/1971 | Slawson | 318/561 UX |
| 3,699,555 | 10/1972 | Du Vall | 318/561 UX |
| 3,729,668 | 4/1973 | Brette | 318/561 |
| 3,731,177 | 5/1973 | Commander | 318/561 |

Primary Examiner—B. Dobeck
Attorney, Agent, or Firm—Frank R. Trifari; Bernard Franzblau

[57] ABSTRACT

A positioning device is subjected to an acceleration during the first part of a step, whilst it is subjected to a deceleration during the second part. The tolerance in the maximum obtainable deceleration is not negligibly small. Therefore, the second part of the step is divided into three phases. In the first phase a standard deceleration is used which is less than the maximum deceleration; in the second phase the deceleration is maximum; in the third phase positional control is effected.

12 Claims, 3 Drawing Figures

POSITIONING DEVICE

The invention relates to a method of positioning a load from a first position to a second position by means of a motor which can reach a maximum acceleration and a maximum deceleration, the said positioning being performed in an acceleration step and a multiphase deceleration step, deceleration being uniform in a first phase and positional control being effected in a last phase. A method of this kind is known from U.S. Pat. No. 3,241,015. Such a method is used, for example, for positioning recording and read heads onto the correct track of a magnetic disc memory. However, the method can also be used in a variety of other fields. The state of the art as described in the said Patent is a control system comprising three positions, i.e., uniform acceleration, acceleration zero, and uniform deceleration. The improvement described in said Patent concerns the positional control in the last phase. Several solutions are known to be used for such a positional control system. Such a method generally functions satisfactorily, but difficulties arise if very small positioning times are to be combined with high accuracy. This is because of the limited dimensions of the region in which positional control can be performed. If the deceleration is fixed in the first phase of the second step, the change-over to this phase must take place at a given location with a tolerance corresponding to that of said limited dimension. Otherwise, this limited region (capturing interval) is reached either at an excessively high or at an excessively low velocity, or is not reached at all. The constant deceleration can be chosen to be equal to the maximum deceleration. The latter has tolerances as a result of external influences such as the ambient temperature and also as a result of the spread in the characteristics of different motors. However, the load also can vary.

So as to achieve a combination of high positioning speed and high accuracy, the invention is characterized in that at a given deviation from said second position a second phase with said maximum deceleration is started, the deceleration in the first phase having a standard value. Because the deceleration in the first phase has a standard value which is less than the maximum value, the tolerances are limited: the standard value can now be chosen to be fixed, with the result that the beginning of the deceleration step can be more accurately determined. The insertion of a second phase with maximum deceleration between the first phase and the last phase implies that positioning is very quickly performed, while the said accuracy is maintained.

A preferred embodiment according to the invention is characterized in that the second phase is terminated at a given second deviation from said second position. Such a deviation can be readily determined.

Another preferred embodiment according to the invention is characterized in that the second phase is terminated at a given minimum velocity. The displacement velocity is usually utilized as one of the input parameters in positional control. Deceleration jumps can thus be avoided so that very smooth control is achieved.

A further preferred embodiment according to the invention is characterized in that a step with uniform displacement velocity occurs between the acceleration step and the deceleration step. For small displacements two steps suffice. For large steps the velocity eventually becomes too high so that an additional step must be inserted, which also influences the instant at which the change-over to the first phase of the deceleration step must take place.

The invention also relates to a device for positioning a load from a first position to a second position, comprising a motor and a servo generator which is connected thereto and by means of which the motor can be driven in an acceleration step and a multi-phase deceleration step, the said motor being capable of reaching a maximum acceleration and a maximum deceleration, the servo generator having an acceleration position and at least two further positions, the said acceleration position producing the said maximum acceleration, a first of the said at least two further positions generating a deceleration signal, a last of said two further positions activating positional control, characterized in that the servo generator comprises, between the first and the last position, an intermediate position which can be controlled by a deviation signal from the motor and by which a maximum-deceleration signal can be generated, the said first position generating a standard-deceleration signal. The motor can be a rotary or linear type, but can also be realized in a different manner, for example, as an hydraulic drive. By switching the servo generator through the three said positions, a simple procedure is realized. The maximum-deceleration and standard-deceleration signals can be readily generated, for example, as analog electrical quantities.

Preferred embodiments of such a device are characterized in that the servo generator can be switched through from said second position under the control of a second deviation signal from a deviation detector, or in that the servo generator can be switched through from said second position under the control of a velocity signal from a velocity detector. For large displacements the maximum velocity might become too high so a preferred embodiment is characterized in that said servo generator comprises, between the acceleration position and said at least two further positions, an additional position which produces a uniform motor speed.

Figure 2:
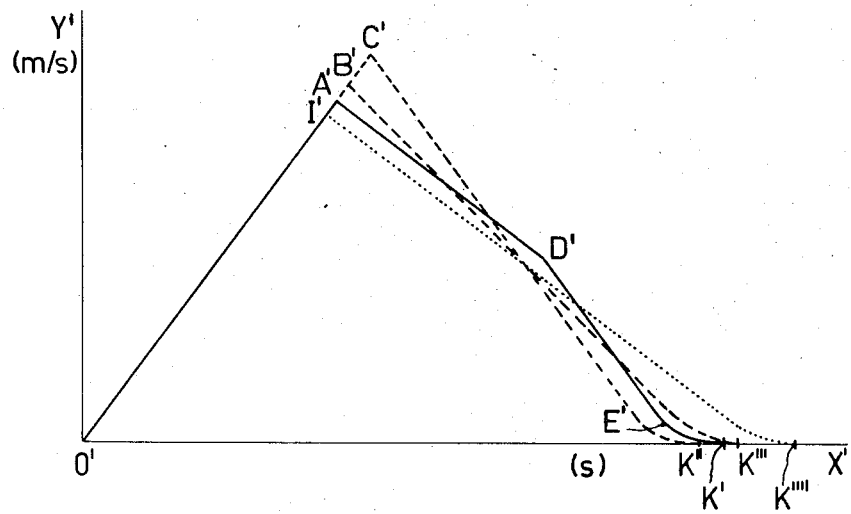
Figure 3:
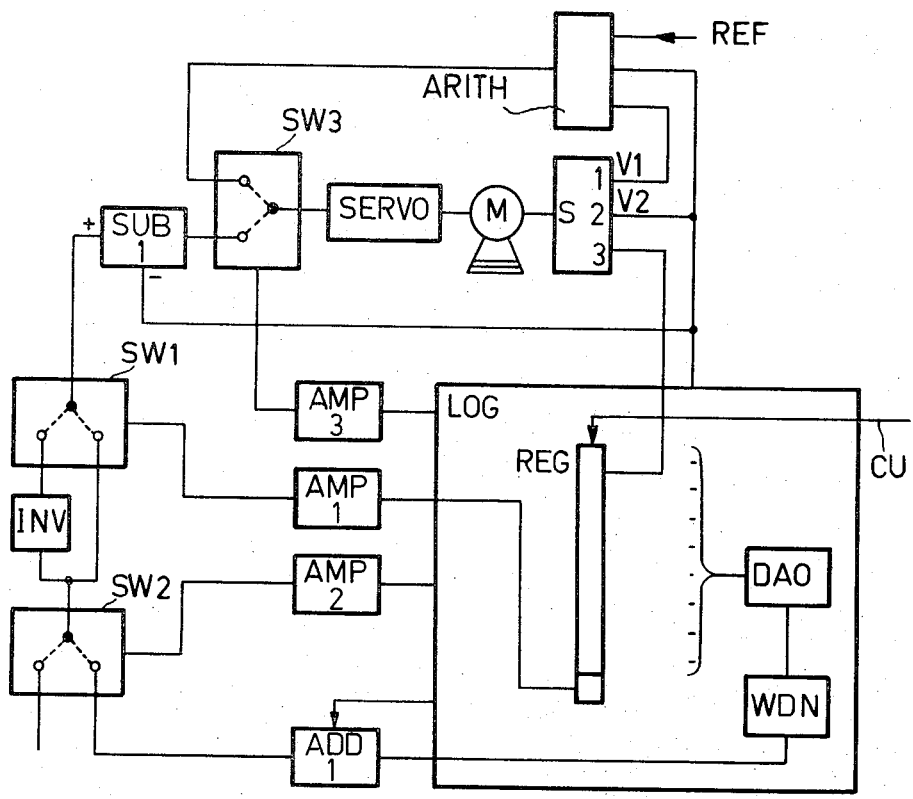

The invention will be described in detail with reference to the accompanying drawing in which FIG. 1 shows some phase diagrams (velocity versus position), FIG. 2 shows some velocity diagrams (velocity versus time), and FIG. 3 shows a block diagram of a device according to the invention.

FIG. 1 shows a phase diagram of a method according to the invention. Plotted on the axis OY is the square of the velocity in $m^2/sec^2$, which corresponds to the displacement energy. In the case of rotary movements, the square of the rotary velocity must be taken as $radian^2/second^2$, and accordingly for other movements. The position is plotted in meters on the axis OX. Corresponding dimensions can also be used for this purpose. Consequently, straight lines in this figure mean uniform accelerations or decelerations or acceleration zero according to the law: energy is the product of force and path.

A case where the movement is produced by means of an electric motor is taken by way of example. The acceleration and deceleration are electrically effected, and the maximum deceleration is equal, for example, to the acceleration in an absolute sense. The invention can also be used in other cases, for example, with mechanical or other braking. The acceleration and deceleration need not be the same in such a case. It is desired to perform the positioning as quickly as possible. To this end, the velocity must be as high as possible at any point in the traject. Assume that the maximum acceleration and the maximum deceleration result in a traject according to the line O-C-K (isosceles triangle). Due to tolerances, the maximum deceleration can decrease: The worst case would correspond, for example, to the (straight) line BDK. The acceleration can be influenced in an analogous manner. Furthermore, it must be taken into account that overshooting of the desired position (K) is extremely unfavourable because upon reversal of the velocity the zero point is passed. This requires a great deal of time. Therefore, phase points above the line B-D-K must absolutely be avoided. Furthermore, it is difficult to determine where the change-over from the acceleration step to the deceleration step must be performed: The distance OK and the actually achievable accelerations and decelerations are also involved in this respect. It appears to be advantageous to choose the reversal point A to be slightly before B, and to decelerate with standard deceleration from F to G.

At D the line AD intersects the line denoting the worst case of the minimum achievable deceleration. At this point the change-over to the maximum deceleration takes place so that the line DE or the line DK is followed, or another straight line therebetween. This is dependent of the value on the load or of the external circumstances. The change-over is now effected at G or, for the sake of safety, slightly sooner, for example at G'. The indication thereof is given by the distance GK which has a fixed value. Because, in addition, the distance GK is much smaller than OK, this fixed value can be accurately adjusted. Positional control is effected at the end of the procedure. The change-over can be effected at a fixed location, for example, at a distance HK from the desired position K, or when a minimum velocity is reached, determined by the length of EH. The positional control provides the displacement from H to K. This can be effected, for example, via one of the solid lines from E to K.

An additional advantage of the method according to the invention is the fact that the angle OAD is larger than the angle OBD. As a result, the tolerance in the change-over point (F) is larger than when travelling as far as the point B. This becomes apparent when the capturing interval near the target K is projected on the line OC by drawing lines parallel to the line segments AD and DE. This becomes more apparent if an intermediate step of uniform movement occurs between the accelerating and the decelerating step, OA and AK, respectively, for example via a line (not shown) OA''A'''D, where A''A''' is horizontal. The reduction of the angle (180°-<A''A'''D) is then substantial.

In practice, for example HK is equal to 50 microns, HG is equal to 100 microns, while OG can vary from a few tens of microns to one or more decimeters. The larger the distance OG, the more time is saved by applying maximum deceleration between the points G and H. This is because the alternative would be the use of the standard deceleration over the entire trajectory as far as H, which is denoted by the broken line I-E.

FIG. 2 shows a velocity diagram of the method according to the invention. The velocity is plotted in meters/second on the axis O'Y'. The time is plotted in seconds on the axis O'X'. In this figure straight lines again denote uniform accelerations or decelerations (or acceleration zero). The area between a completed traject and the time axis denotes the completed traject. Some of the trajects of FIG. 1 are shown, all trajects leading to the same position. Consequently, the area below the curves is always the same. However, the instant of arrival is not. The traject which is completed when the method according to the invention is followed is denoted in FIG. 1 by a solid line OIADEK. In FIG. 2 it is denoted accordingly by the line O'I'A'D'E'K'. The traject with maximum acceleration and deceleration is denoted in FIG. 1 by the line OIABCK, and in FIG. 2 by the line O'I'A'B'C'K''. The traject with constant deceleration, the worst case, is denoted in FIG. 1 by the line OIABDK, and in FIG. 2 by the line O'I'A'B'K'''. The latter two cases are shown in FIG. 2 with a curved end so as to indicate the operation of the positional control system. If no positional control system is present, which is suggested in FIG. 1 by the straight end near K of the relevant trajects, the end could also be straight. The end of the traject would then be reached more quickly. The latter is the case with constant standard-deceleration (and positional control) in the second step. This is denoted in FIG. 1 by the line OIEK; in FIG. 2 by the line O'I'K''''. The saving of time of K' with respect to K'''' is clearly shown in FIG. 2. The distance from K''' to K' is not very large.

The concept of the invention, i.e., making the deceleration in a later phase larger than in a previous phase, can also be utilized in a slightly different manner by proceding directly from D to K in FIG. 1, instead of via E. This can be done by limiting the deceleration by means of a limiter. The deceleration can be determined by connecting a velocity detector to an additional differentiating element. Even though a differentiating element generally supplies rather inaccurate results, the length of the segment GK is small so the inaccuracy also remains small. Therefore, the deceleration is controlled to maximum unless a given limit deceleration is exceeded. In this manner the straight line DK in FIG. 1 is better approximated. As a result of the small number of phases (three in the example), the control remains uncomplicated.

FIG. 3 shows a block diagram of a device according to the invention, comprising a motor M, a sensor S having outputs 1, 2, 3, a logic unit LOG comprising a difference register REG, a digital-to-analog converter DAO, and a function generator WDN. The device also includes an inverter INV, an adder ADD1, a subtractor SUB1, an arithmetic unit ARITH, three switches SW 1, 2, 3, three amplifiers AMP 1, 2, 3, and one output amplifier SERVO.

The operation is as follows: the motor M is connected to the load (not shown) so that the position of the motor indicates the position of the load. If desired, the motor M can also be provided with a revolution counter. The sensor S detects the position of the motor and translates this position into a signal on the output 1. The sensor S further comprises a differentiating element which is capable of generating counting pulses. It is thus signalled if the load passes one of a number of regularly spaced positions. If the positioning device is used in conjunction with a magnetic disc store, these positions correspond, for example, to the different tracks. The counting pulses appear on the output 3. A signal representing the velocity is generated by another differentiating element and appears on output 2.

If a new position is to be adjusted, the difference with respect to the old position is applied to the difference register REG. The first bit of the information then indicates the sense of the displacement, i.e., forwards or backwards. The information of this bit controls the switch SW1, for example, through the amplifier AMP1. In the position "backwards" a control signal passes through the inverter INV and is inverted. In the position "forwards," the control signal does not pass through the inverter INV. The information is applied to the register REG from the outside, for example, by a computer which controls the positioning procedure (via line CU). Additional information relating to the number of motor revolutions to be performed can be added to the information.

Subsequently, the information in the register REG is compared in the logic unit LOG with a predetermined level which corresponds to a given deviation. If the actual deviation is larger (in an absolute sense), the switches SW2 and SW3 are set for transmitting signals of elements ADD1 and SUB1, respectively, for example, in that relevant information signals are amplified in the amplifiers AMP2 and AMP3 so as to form switching signals. The information of the register (excluding the information concerning the direction of the deviation) is converted into an analog signal in the digital-to-analog converter DAO. Consequently, this analog signal can have a limited number of discrete values. This analog signal is converted in the function generator WDN to a signal according to the function:

$$v = \sqrt{2as}$$

Therein, $s$ is the deviation which is expressed, for example, in meters, $a$ is a standard deceleration in meters per second square, and $v$ is a velocity in meters per second: this is the velocity which is reached after completion of a traject $s$ with acceleration $a$, or the velocity at which a traject $s$ can yet be completed to standstill if a deceleration $a$ is dictated. For $a$ a given value is chosen in advance. The signal from the function generator WDN reaches the output amplifier SERVO via the adder ADD1, the switch SW2, possibly the inverter INV, the switch SW1, the subtractor SUB1 and the switch SW3. The subtractor SUB1 subtracts the velocity (output 2 of sensor S) from the signal of the function generator WDN. Generally, the signal of the function generator WDN is initially much larger than the velocity signal. As a result, the output amplifier SERVO receives a large input signal and the acceleration of the motor M is maximum. This acceleration is limited, for example, in that the output amplifier SERVO is saturated. The velocity continues to increase and the output signal of the function generator WDN continues to decrease. This is because the information of the register REG is counted down because of the counting pulses on the output 3 of the sensor S. To this end, this register can operate as a counter. At a given instant the difference between the output signals of the function generator WDN and the output 2 of the sensor S will become so small that the output amplifier SERVO is no longer saturated. The acceleration then decreases. The said difference decreases further and subsequently changes its sign so that the motor is decelerated. The output signal of the function generator WDN and the signal on the output 2 of the sensor S then decrease together. The function generator WDN can be adjusted such that said difference now obtains a fixed (absolute) value, so that the output amplifier SERVO is not over-driven and a standard deceleration is achieved. If the desired velocity is substituted for $v$ in the said formula $v = \sqrt{2as}$ and the function generator forms $\sqrt{2as}$, the deceleration becomes $a$. The output signal of SUB1 is then ($\sqrt{2as} - x$), $x$ being the — actual speed —. Variations in this difference are passed on to the motor so that the deceleration is substantially constant. In some cases it may take some time before the motor M starts to decelerate: it may be that the required reversal of the current direction takes some time. In the case of other types of motor, this may also require some time. Consequently, the deceleration will be small at the beginning of the deceleration procedure, it will subsequently increase and become maximum (possibly), and subsequently it will become smaller again until the actual velocity differs by only a given amount from the desired velocity, and the deceleration of the motor becomes equal to the standard deceleration.

If the contents of the register REG reach a given value, for example, 00001, so that the next countdown pulse on output 3 of sensor S would make the contents equal to zero, the following happens: this is detected in the logic unit LOG, with the result that a signal is applied to the switch SW1 via the amplifier AMP1. As a result, the switch SW1 is switched over while, in addition, the contents of the register REG are set to maximum. The deceleration then becomes maximum (output amplifier saturated so that it seems as if the acceleration is maximum, but in the opposite direction). When the velocity has dropped below a given value, this is detected by the logic unit LOG (also connected to the output 2 of the sensor S). In reaction thereto, the logic unit LOG applies a signal, via the amplifier AMP3, to the switch SW3 so that the latter switches over and actuates a positional control system. This switching over, however, can also be controlled in another manner, for example, by a given position of the register REG. Positional control is effected by means of the arithmetic unit ARITH.

Present on the input REF is a reference signal which indicates the desired position, for example, 0 volts. The arithmetic unit ARITH reduces the reference signal by the signal present on the output 1 of the sensor S (the position signal and, if the reference level on the input REF is 0 volts, also the deviation signal) and by the signal on the output 2 of the sensor S (the velocity signal). The motor M is controlled by the output signal of ARITH. ARITH can be actuated in that the switch SW3 comprises an actuation contact such that an actuation signal is applied to ARITH when SW3 is in the upper position. The operation of the positional control system is further as described in the relevant literature.

The changing-over to the last phase can also take place at a given minimum deviation, i.e., by applying the signal on the output 1 of sensor S to a level detector in the above case. When the threshold level is reached, switch SW3 receives a switching signal from the level detector.

If the speed of the motor becomes too high, the step with uniform velocity can be used. This can be effected by connecting said output 1 of sensor S to a second level detector. When the level is reached, a switching signal of this second level detector blocks the output amplifier SERVO. In the absence of friction, the motor then continues at a uniform speed. The two level detectors are omitted in the drawing for the sake of simplicity.

What is claimed is:

1. A method of positioning a load from a first position to a second position by means of a motor which can reach a given maximum acceleration and a maximum deceleration which comprises, driving the motor towards the second position with an acceleration step and a multi-phase deceleration step, the acceleration being at the maximum acceleration during the acceleration step and the deceleration being constant during a first phase of the deceleration step at a standard value below said maximum deceleration, at a given distance from said second position starting a second phase of the deceleration step in which the motor is driven with said maximum deceleration, and driving the motor under positional control during the last phase of the deceleration step to bring the load to rest at the second position.

2. A method as claimed in claim 1, characterized in that the second phase is terminated and the last phase begun at a given second distance from said second position.

3. A method as claimed in claim 1, characterized in that the second phase is terminated when the motor reaches a given minimum velocity.

4. A method as claimed in claim 1, characterized in that a step with uniform displacement velocity is provided between the acceleration step and the deceleration step.

5. A device for positioning a load from a first position to a second position comprising, a motor coupled to the load and a servo control generator connected thereto and by means of which the motor can be driven from said first position to said second position in an acceleration step and a multi-phase deceleration step, the motor being capable of reaching a maximum acceleration and a maximum deceleration, the servo generator having means for deriving an acceleration signal and at least two further signals, means for applying said acceleration signal to the motor to produce said maximum acceleration, a first of the two further signals being a standard deceleration signal which will drive the motor at a deceleration less than said maximum deceleration, means responsive to the last of said two further signals for activating a positional control device coupled to the motor, means responsive to the motor for deriving a deviation signal indicating the distance to the second position, means for applying the deviation signal to the servo generator which in response thereto generates an intermediate signal between the first and the last signals of a value to produce said maximum motor deceleration, and means for applying said maximum deceleration signal to the motor between the first and last signals.

6. A device as claimed in claim 5, characterized in that the servo generator can be switched through from said second position under the control of a second deviation signal from a deviation detector.

7. A device as claimed in claim 5, characterized in that the servo generator can be switched through from said second position under the control of a velocity signal from a velocity detector.

8. A device as claimed in claim 5 characterized in that said servo generator further comprises means for generating an additional signal between the acceleration signal and said first standard deceleration signal and of a value to produce uniform motor speed, and means for applying the additional signal to the motor to drive same at said uniform speed.

9. A system for positioning a load between first and second positions comprising, a motor coupled to the load, a motor control unit for controlling the acceleration and deceleration of the motor to provide an acceleration step and a multi-phase deceleration step, means for sensing the motor position and providing control signals indicative thereof, a positional control system controlled by said control signal, means for supplying to said motor control unit a signal representative of the distance the load must travel between said first and second points, means for applying said control signals to said motor control unit, said control unit including means for generating an acceleration signal of a value to drive the motor at maximum acceleration and first and second deceleration signals in the order named, said first deceleration signal being of a value to drive the motor at a fixed deceleration value less than the maximum motor deceleration during a first deceleration phase and the second deceleration signal being of a second value to drive the motor at its maximum deceleration during a second deceleration phase of the deceleration step, said motor control unit being responsive to said control signals to switch over from the generation of said first deceleration signal to said second deceleration signal at a given deviation of the motor from said second position, and means controlled by said control unit for selectively coupling said positional control system to the motor during the last phase of the deceleration step.

10. A system as claimed in claim 9 further comprising means for sensing the motor speed and providing a velocity signal proportional thereto, said motor control unit including means responsive to said velocity signal for terminating the second phase of the deceleration step and initiating the last phase thereof at a given minimum speed of the motor.

11. A system as claimed in claim 9 wherein said motor control unit includes means responsive to the position control signals for terminating the second phase of the deceleration step and initiating the last phase thereof at a second given deviation distance of the motor from said second position.

12. A system as claimed in claim 9 further comprising means for sensing the motor speed and providing a velocity signal proportional thereto, and wherein said motor control unit includes a difference register to which is applied said signal representative of the load travel distance and a sequence of counting pulses from said motor position sensing means, a digital-to-analog converter for converting the register count to an analog signal, a function generator controlled by said analog signal to generate a second velocity signal that varies with the register count, a subtractor unit, means for applying the first and second velocity signals to said subtractor, said subtractor supplying a drive signal to the motor that is proportional to the difference between said first and second velocity signals.

* * * * *

UNITED STATES PATENT OFFICE
CERTIFICATE OF CORRECTION

Patent No. 3809986　　　　　　　Dated May 7, 1974

Inventor(s) Wim Visser

It is certified that error appears in the above-identified patent and that said Letters Patent are hereby corrected as shown below:

IN THE SPECIFICATIONS column 1, line 20, cancel "to" and insert --which can--;

line 48, after "second" insert --(intermediate)--;

column 2, line 13, cancel ", the" and insert --. The--;

cancel "having" and insert --has--;

line 18, after "activating" insert --a--;

line 19, cancel the comma(,) and insert --. The invention is--;

lines 33 & 36, after "second" insert --(intermediate)--;

line 33, after "position" insert --of the deceleration step--;

column 3, line 8, after "traject" insert --(path)--;

IN THE CLAIMS

6. A device as claimed in claim 5, charac-

PAGE TWO

PO-1050
(5/69)

UNITED STATES PATENT OFFICE
CERTIFICATE OF CORRECTION

Patent No. 3809986      Dated May 7, 1974

Inventor(s) Wim Visser

It is certified that error appears in the above-identified patent and that said Letters Patent are hereby corrected as shown below:

terized in that <u>the intermediate signal is generated at an intermediate position and</u> the servo generator can be switched through from said [second] <u>intermediate</u> position under the control of a second deviation signal from a deviation detector.

7.      A device as claimed in claim 5, characterized in that <u>the intermediate signal is generated at an intermediate position and</u> the servo generator can be switched through from said [second] <u>intermediate</u> position under the control of a velocity signal from a velocity detector.

Signed and Sealed this eighteenth Day of November 1975

[SEAL]

Attest:

RUTH C. MASON
*Attesting Officer*

C. MARSHALL DANN
*Commissioner of Patents and Trademarks*